C. E. ARCHER & E. C. HUMPHREYS.
DIRIGIBLE ELECTRIC LAMP.
APPLICATION FILED JAN. 19, 1917.
1,259,823.
Patented Mar. 19, 1918.
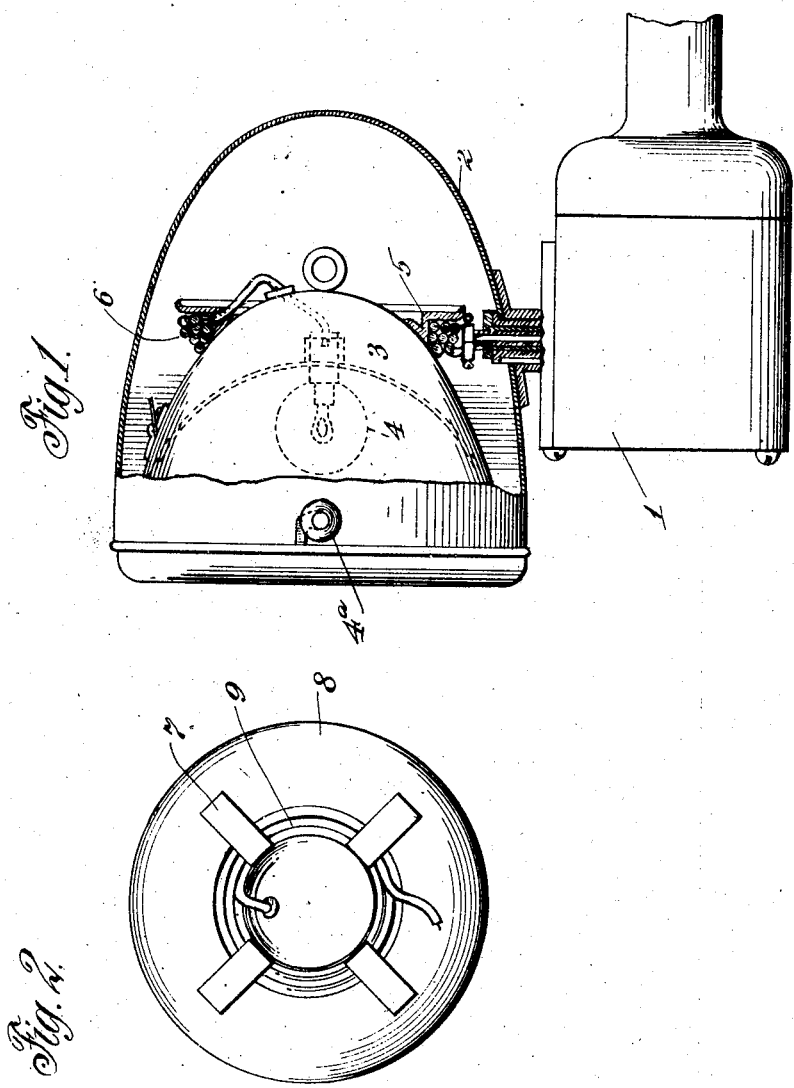

UNITED STATES PATENT OFFICE.

CHARLES E. ARCHER AND EDWARD C. HUMPHREYS, OF DETROIT, MICHIGAN.

DIRIGIBLE ELECTRIC LAMP.

1,259,823.

Specification of Letters Patent.

Patented Mar. 19, 1918.

Application filed January 19, 1917. Serial No. 143,283.

*To all whom it may concern:*

Be it known that we, CHARLES E. ARCHER and EDWARD C. HUMPHREYS, citizens of the United States of America, residing at Detroit, in the county of Wayne and State of Michigan, have invented certain new and useful Improvements in Dirigible Electric Lamps, of which the following is a specification, reference being had therein to the accompanying drawings.

This invention relates to a dirigible electric lamp, and more particularly to that type of lamp commonly styled a "spot light," adapted for mounting on the windshield or suitable support of an automobile, to be manually manipulated from the driver's seat so as to cast a ray of light ahead of the automobile.

Our invention aims to furnish a reflector or lamp casing with a reel or holder upon which electric conductors or cables may be readily wound and stored, so that the lamp may be used at a remote point by simply unwinding the electric conductors or cables. Such a reel or holder obviates the necessity of storing the conductors and cables in a special compartment and prevents the conductors or cables from becoming entangled or unduly injured.

Our invention will be hereinafter specifically described and then claimed, and reference will now be had to the drawing, wherein—

Figure 1 is a side elevation of a lamp or headlight, partly broken away and partly in section, showing one form of reel or holder, and Fig. 2 is the rear elevation of a lamp casing or reflector provided with another form of reel or holder.

In order to identify our present invention with our other inventions, we have shown a housing 1 that is capable of being adjusted and above the housing is a swiveled headlight casing 2. The casing is somewhat paraboli-form and has an open end provided with a detachable headlight or lamp casing 3 containing a lamp 4. This detachable headlight may be conveniently connected to the casing 2 by an ordinary bayonet joint 4ª.

Suitably secured to the inner end of the lamp casing 3 is a reel or holder 5 and wound on the reel or holder is a cable 6, said cable having the outer convolution thereof extending through the swiveled headlight casing 2 to a suitable source of electrical energy, as batteries (not shown). The inner convolution of the cable extends through the reel or holder into the lamp casing 3 and is connected to the lamp 4.

In Fig. 2 of the drawing there is illustrated a slight modification of our invention wherein a plurality of arms 7 are disposed upon a lamp casing 8 to coöperate with said casing in forming a reel or holder for electrical conduits or a cable 9. The reel or holder 5 is preferably in the form of a ring or annular flange that is somewhat Z shaped in cross section, so that a portion of the reel or holder will serve as a hub and another portion thereof coöperates with the walls of the casing 3 in forming a channel for the cable. In either instance, the cable can be wound and unwound as the lamp casing is moved relative to the headlight casing and with the reel or holder on the lamp casing, it is unnecessary to provide a special compartment in the headlight casing for the cable.

While in the drawing there are illustrated the preferred embodiments of our invention, it is to be understood that the structural elements are susceptible to such variations and modifications as fall within the scope of the appended claim.

What we claim is:—

The combination of a headlight casing, a detachable lamp casing in the front end of said headlight casing and having a convex wall in said headlight casing, a cable, and means disposed about the convex wall of said lamp casing coöperating with the convex wall thereof in providing a reel for said cable, said reel being disposed at right angles to the axis of said lamp and said cable being wound on said reel with the inner convolution thereof extending into said lamp casing and the outer convolution extending out of said headlight casing.

In testimony whereof we affix our signatures in presence of two witnesses.

CHARLES E. ARCHER.
EDWARD C. HUMPHREYS.

Witnesses:
KARL H. BUTLER,
ANNA M. DORR.

Copies of this patent may be obtained for five cents each, by addressing the "Commissioner of Patents, Washington, D. C."